United States Patent [19]

Corte et al.

[11] 4,115,261

[45] Sep. 19, 1978

[54] PROCESS FOR TREATING DRINKING WATER AND SEWAGE

[75] Inventors: Herbert Corte, Opladen; Harold Heller, Cologne; Michael Lange; Otto Netz, both of Leverkusen, all of Germany

[73] Assignee: Bayer Aktiengesellschaft, Germany

[21] Appl. No.: 755,225

[22] Filed: Dec. 29, 1976

Related U.S. Application Data

[60] Division of Ser. No. 623,785, Oct. 20, 1975, Pat. No. 4,025,705, which is a continuation of Ser. No. 480,563, Jun. 18, 1974, abandoned.

[30] Foreign Application Priority Data

Jun. 23, 1973 [DE] Fed. Rep. of Germany ....... 2332103

[51] Int. Cl.$^2$ ............................................. C02B 1/14
[52] U.S. Cl. .................................................... 210/40
[58] Field of Search ............... 210/24, 37 R, 39, 38 R, 210/40; 260/2.1 R, 2.2 R; 252/426; 526/13–17, 19, 20, 46, 49

[56] References Cited

U.S. PATENT DOCUMENTS

| 3,337,479 | 8/1967 | Small | 260/2.1 R |
|---|---|---|---|
| 3,531,463 | 9/1970 | Gustafson | 210/40 |
| 3,663,467 | 5/1972 | Albright | 210/24 R |
| 3,727,379 | 4/1973 | Bijleveld et al. | 55/73 |
| 3,853,758 | 12/1974 | Hurwitz et al. | 210/37 R |

*Primary Examiner*—Charles N. Hart
*Assistant Examiner*—Ivars Cintins
*Attorney, Agent, or Firm*—Connolly and Hutz

[57] ABSTRACT

The invention relates to a process for removing oleophilic odor- and tasteproducing substances from water by treating the water with an insoluble, macroporous adsorber resin comprising a matrix based on a crosslinked organic polymer containing aromatic nuclei, the polymer containing chloromethyl groups as substituents; some of the chlorine atoms in the chlormethyl groups can be reacted with ammonia or amines, furthermore the invention relates to the adsorber resins to be used in the claimed process.

15 Claims, No Drawings

PROCESS FOR TREATING DRINKING WATER AND SEWAGE

CROSS-REFERENCE TO RELATED APPLICATION

This application is a division of application Ser. No. 623,785 filed Oct. 20, 1975 and now U.S. Pat. No. 4,025,705, which, in turn, is a continuation of application Ser. No. 480,563 filed June 18, 1974 and now abandoned.

This invention relates to an improved process for removing odour- and taste-producing substances from water, and to a new macroporous adsorber resin.

Hygienically satisfactory drinking water is becoming increasingly difficult to supply on account of worsening pollution, especially of rivers. Because reserves of drinking water are limited, increasing demand is making it necessary to use basically undrinkable bank filtrates and surface waters. The methods previously used to convert waters of this kind, which are heavily polluted by organic and inorganic substances, into a physiologically acceptable drinking water are unsatisfactory. Processes for removing taste- and odour-producing substances from water (so-called drinking-water conditioning processes) have already been proposed. For example, active carbon can be used for the treatment of drinking water. One serious disadvantage of processes of this kind is that, after only a short time, the active carbon is no longer able to adsorb the oleophilic odour- and taste-producing substances which are present in the water and which can be extracted with chloroform, with the result that the quality of the water thus treated is unsatisfactory (cf. P. Koppe Gesundheits-Ingenieur 88, 312-317 (1967).

Another prior proposal is the treatment of water with macroporous resins in order to remove certain organic substances (U.S. Pat. Nos. 3,727,379 and 3,531,463). Unfortunately, tests have shown that these processes are also unsatisfactory when they are used for removing oleophilic odour- and taste-producing substances from water.

A process for removing oleophilic odour- and taste-producing substances from water by treatment with an insoluble macroporous adsorber resin has now been found, having the characteristic feature that the insoluble, macroporous adsorber resin comprises a matrix based on a crosslinked organic polymer containing aromatic nuclei, the polymer containing chloromethyl groups as substituents; some of the chlorine atoms in the chlormethyl groups can be reacted with ammonia or amines.

The polymers used as matrix in the process according to the invention are known per se. For example, copolymers containing monomeric units of an aromatic monovinyl compound and of at least one aromatic polyvinyl compound have proved to be particularly advantageous.

The following are mentioned as examples of monovinyl compounds: styrene, substituted styrenes such as p-methyl-styrene, dimethylstyrene, ethylstyrene, vinylanisole, α-methylstyrene and vinylnaphthalene.

Examples of polyvinyl compounds include divinylbenzene, divinyltoluenes, divinylnaphthalenes, diisopropenyl-benzene, diallylphthalate, ethylene glycol diacrylate, ethylene glycol dimethacrylate, divinylxylene, divinylethylbenzene, divinylsulphone, polyvinyl or polyallyl ethers of glycol, glycerol or pentaerythritol, divinyl ketone, divinylsulphide, allyl acrylate, diallylmaleate, diallylfumarate, diallylsuccinate, diallylcarbonate, diallylmalonate, diallyloxalate, diallyladipate, diallylsebacate, divinylsebacate, diallyltartrate, diallylsilicate, triallylaconitate, triallylcitrate, triallylphosphate, N,N'-methylene diacrylamide, N,N'-methylene dimethacrylamide, N,N'-ethylene diacrylamide, trivinylbenzene, trivinylnaphthalene, polyvinylanthracenes, trivinylcylohexane and 1,3,5-triacryloylhexahydro-s-triazine.

Preferred monovinyl compounds are styrene, vinyltoluene or vinylnaphthalene, whilst preferred polyvinyl compounds are divinylbenzene, trivinylbenzene, ethylene glycol dimethacrylate or 1,3,5-triacryloylhexahydro-s-triazine.

It has proved to be advantageous in some cases to polymerise into the copolymers used as matrix other vinyl compounds such as, for example, ethylene, propylene, isobutylene, vinyl chloride, vinylacetate, vinylidene chloride, acrylic compounds or methacrylic compounds, especially acrylonitrile. In addition, polyethylenically unsaturated compounds such as, for example, isoprene, butadiene, chloroprene, piperylene, pentadiene, hexadiene, octadiene, decadiene, hexatriene, cyclopentadiene, and their substitution products, for example chloroprene, 2,3-dimethylbutadiene, 2,5-dimethylhexadiene or 2,5-dimethyloctadiene, can also be polymerised into the copolymers.

Macroporous adsorber resins based on copolymers of styrene and divinylbenzene, ethylene glycol dimethacrylate or 1,3,5-triacryloyl-hexa-s-triazine are preferably used.

The aromatic vinyl polymers used for the process according to the invention generally contain from 1 to 50%, preferably from 3 to 30%, of polyvinyl compounds. The macroporous structure of the adsorber resins to be used in the process according to the invention can be achieved by polymerisation in the presence of high molekular weight substances, of swelling agents or of precipitants, or by a combination of these methods (cf. Ad. Polymer, Sci. Vol. 5 (1067), pages 113-213).

The porosity of the vinyl aromatic polymerisation resins used in the process according to the invention is generally in the range of from 20 to 80% by volume, preferably in the range of from 30 to 60% by volume, and their active surface is generally in the range of from 10 to 1000 $m^2/g$, preferably in the range of from 20 to 200 $m^2/g$.

The chlormethyl groups present as substituents in the macroporous adsorber resins can be introduced by conventional methods, for example by chlormethylation with chloromethylmethyl ether in accordance with U.S. Pat. No. 2,591,573, or with methylal/sulphuryl chloride or methylal/chlorsulphonic acid in accordance with U.S. Pat. Nos. 3,297,648 or 3,417,066, or by side-chain chlorination of the corresponding polyalkylstyrenes.

The adsorber resins used for the process according to the invention generally contain from 0.05 to 1.2 chlormethyl groups, preferably from 0.1 to 1.0 chlormethyl groups, per aromatic nucleus. Particularly good results are obtained when the adsorber resin contains from 5 to 25% by weight, preferably from 10 to 20% by weight, chlorine refered to the weight of the adsorber resin whereby the chlorine content is a measure for the number of chloromethyl groups present in the resin.

In one preferred embodiment of the process according to the invention, the adsorber resins used are partially aminated by partial reaction of the chlorine atoms with ammonia or amines.

The adsorber resins used in this preferred embodiment can be obtained from the aforementioned chlormethyl-group-containing products by reaction with a deficit, referred to the quantity of chlormethyl groups, of the amines. The deficit is stoichiometrically measured in such a way that at least 10%, preferably at least 90%, of the chlormethyl groups remain intact as such.

Preferred amines for aminating the adsorber resins containing chlomethyl groups are primary or secondary amines or mixtures thereof, and also polyamines having primary or secondary amino groups such as, for example, polyalkylene polyamines. Organic radicals of the primary or secondary amines may be unsubstituted or substituted hydrocarbon radicals, for example aliphatic, aromatic, cycloaliphaticor araliphatic hydrocarbon radicals. The following amines are mentioned by way of example: methylamine, dimethylamine, n-butylamine, isobutylamine, dibutylamine, aniline, benzidine, o-, m- and p-tolidine, xylidines, $\alpha$- and $\beta$-naphthylamine, naphthalene diamines, benzylamine, dibenzylamine, phenylene diamine, benzylaniline, benzylethylamine, methylaniline, cyclohexylamine, dicyclohexylamine, diethylene triamine, triethylene tetramine, tetraethylene pentamine, 3,3'-imino-bis-propylamine, propylene diamine and oxalkylamines, such as ethanolamine, methylethanolamine and diethanolamine. The aforementioned compounds can be used either individually or in admixture.

Primary or secondary aliphatic amines having $C_1$-$C_8$-alkyl radicals are particularly preferred.

In addition, the adsorber resins used for the process according to the invention can contain other substituents such as sulpho groups, carboxyl groups, nitrile groups and/or ester groups.

The invention also provides new, insoluble adsorber resins, consisting of a matrix based on a crosslinked organic polymer containing aromatic nuclei, which contain as substituents from 0.05 to 1.2, preferably from 0.1 to 1.0, chlormethyl groups per aromatic nucleus, and in which the chlorine in the chlormethyl groups is partially aminated by reaction with ammonia or amines, the ratio of the resulting aminomethyl groups to the chlormethyl groups being in the range of from 1:99 to 90:10, preferably in the range of from 5:95 to 80:20 especially from 5:95 to 60:40.

In the practical application of the process according to the invention, the macroporous adsorber resins used for the process according to the invention are initially eluted with ethanol, to neutralise odour and taste, until the alcohol running off as eluate no longer hazes when diluted with water.

The macroporous adsorber resins can be used in the process according to the invention, for example, in the form of powders or, preferably, in the form of a bead polymer, for example in a filter bed or according to the settling filtration principle, as known per se. For example, the adsorber resin can be introduced into a column, as in the technique used for filtration with active carbon, and the water to be purified can then be passed through, the residence time of the water in the column being varied according to the degree of pollution.

The exhausted adsorber resins are best regenerated with solvents the solubility parameter of which differs by at least 1, but preferably by more than 2, from that of the adsorber resin.

The process according to the invention is used for removing from drinking water oleophilic constituents which adversely affect both the smell and taste of water. In addition, in the treatment of sewage, the content of organic compounds, especially oleophilic constituents, can be very considerably reduced by the process according to the invention.

The adsorber resins used in accordance with the invention are distinguished by their considerably improved adsorption capacity for oleophilic odour- and taste-producing substances, this capacity being several times greater than that of conventional adsorbents.

The following Examples illustrate the invention.

EXAMPLES 1 TO 5

The water treated in Examples 1 to 5 was Leverkusen tap water, which consists largely of Rhine bank filtrate. This water was pretreated by breakpoint-chlorination followed by filtration over active carbon. It had a musty, unappetising odour which made it substantially undrinkable (cf. Koppe, Gesundheitsingenieur 88, 1967, page 312, 313).

The macroporous adsorber resins used for Examples 1 to 5 were macroporous polystyrene resins crosslinked with divinylbenzene, their degree of crosslinking (divinylbenzene content) and their porosity, produced by polymerisation in the presence of isododecane, being quoted in columns 2 and 3 of Table 1. Column 4 of Table 1 shows the active surface of the resins used, as determined by the BET-method, for the individual Examples.

The adsorber resins used in Examples 1 to 5 were chlormethylated by reaction with methylal/sulphuryl chloride in accordance with U.S. Pat. No. 3,297,648, and they were subsequently aminated by reaction with aqueous ammonia.

Columns 5 and 6 of Table 1 show the chlormethyl group content of the adsorber resins by quoting the percentage chlorine content and the degree of amination of the chlormethyl groups which is characterised by the percentage nitrogen content of the adsorber resins.

Examples 1 to 5 which illustrate the process according to the invention, are followed for comparison by Examples 1a to 5a, in which the corresponding unsubstituted macroporous resins are tested. Since it was found by preliminary tests with drinking water and sewage that the adsorbents described in U.S. Pat. No. 3,727,379 produced even poorer results than the adsorbents of U.S. Pat. No. 3,531,463, comparison tests were only carried out with the adsorbents of U.S. Pat. No. 3,531,463. In addition in Example 6 a comparison test is carried out using active carbon for removing odour- and taste-producing substances.

Odour and flavour testing of the water, and its content of oleophilic substances which can be extracted with chloroform, were used as criteria for the effectiveness of the filter materials.

Column 7 in Table 1 shows the load capacity of the adsorber resins, which is defined as that quantity (in liters) of water which can be passed through 1 liter of the adsorber resin before evidence of odour can be organoleptically detected.

In order to determine the quantity of oleophilic substances which can be extracted with chloroform, 25 liters of the water treated by the process according to the invention were extracted with chloroform by countercurrent in a pulsating column. The residue of the extract freed from chloroform was gravimetrically determined and the difference in relation to the residue obtained from untreated water was tabulated as a percentage reduction Δ (column 8).

In all the adsorption tests, the filtration rate was 50 liters of water per liter of adsorber resins per hour.

Table 1

| 1 | 2 | 3 | 4 | 5 | 6 | 7 | 8 |
|---|---|---|---|---|---|---|---|
| Ex. | Cross-linking % | Porosity % by volume | Surface m²/g | Cl-content % by weight | N-content % by weight | Load capacity (liters) | Δ |
| 1 | 3 | 55 | 70 | 17 | 0.9 | >300,000 | 45 |
| 2 | 5 | 50 | 68 | 17 | 1.2 | >300,000 | 60 |
| 3 | 6 | 45 | 76 | 18 | 0.6 | >300,000 | 65 |
| 4 | 7 | 45 | 102 | 17 | 0.6 | >300,000 | 95 |
| 5 | 4 | 52 | 65 | 17 | 0.9 | >300,000 | 50 |
| 1a | 3 | 55 | 75 | 0 | 0 | 48,000 | 9 |
| 2a | 5 | 50 | 70 | 0 | 0 | 6,000 | 35 |
| 3a | 6 | 45 | 81 | 0 | 0 | 140,000 | 17 |
| 4a | 7 | 45 | 120 | 0 | 0 | 144,000 | 35 |
| 5a | 4 | 52 | 75 | 0 | 0 | 49,000 | 15 |
| 6 | active carbon (grain size 0.1 - 1mm) | | | | | 36,000 | >5 |

EXAMPLE 7

The brown-coloured water of a biological treatment plant, about 80% of which consisted of domestic sewage and about 20% of effluent from a chemical factory, was treated by the process according to the invention. The macroporous adsorber resin used was chlormethylated polystyrene which had been crosslinked with 6% of divinylbenzene, had a porosity of 60% by volume and an active surface of 168 m²/g. The adsorber resin had a chlorine content of 8% by weight, and the N-content produced by amination with diethylamine was 1.6% by weight.

The sewage was filtered through the adsorption resin with a specific load of 50 liters per liter of resin per hour.

Before filtration the sewage to be treated contained 140 mg/l of dissolved organic carbon. After treatment, the dissolved organic carbon content was 22 mg/l, and the filtrate running off was colourless.

What we claim is:

1. A process for removing oleophilic odour- and taste-producing substances from water wherein the water is treated with an insoluble macroporous adsorber resin comprising a matrix based on a crosslinked organic polymer containing aromatic nuclei substitued by substituents consisting essentially of (1) chloromethyl substituents or (2) chloromethyl substituents partially aminated by reacting some of the chlorine atoms thereof with a member selected from the group consisting of ammonia, primary amines and secondary amines.

2. A process as claimed in claim 1, wherein the matrix of the adsorber resin is a copolymer of an aromatic monovinyl compound and at least one aromatic polyvinyl compound.

3. A process as claimed in claim 1, wherein the matrix of the adsorber resin is a copolymer of styrene and divinylbenzene.

4. A process as claimed in claim 1, wherein the matrix of the adsorber resin is a copolymer of styrene and ethylene glycol dimethacrylate.

5. A process as claimed in claim 1, wherein the matrix of the adsorber resin is a copolymer of styrene and 1,3,5-diacryloylhexahydro-s-triazine.

6. A process as claimed in claim 1, wherein the matrix of the adsorber resin is a copolymer of an alkylstyrene with divinylbenzene.

7. A process as claimed in claim 1, wherein the adsorber resin contains from 1 to 50% of at least one polyvinyl compound as monomeric units.

8. A process as claimed in claim 1, wherein the adsorber resin contains from 3 to 30% of monomeric units of at least one polyvinyl compound.

9. A process as claimed in claim 1, wherein the adsorber resin has a porosity of from 20 to 80% by volume.

10. A process as claimed in claim 1, wherein the adsorber resin has a porosity of from 30 to 60% by volume.

11. A process as claimed in claim 1, wherein the adsorber resin has an active surface of from 10 to 1000 m²/g.

12. A process as claimed in claim 1, wherein the adsorber resin has an active surface of from 20 to 200 m²/g.

13. A process as claimed in claim 1, wherein the adsorber resin contains from 0.05 to 1.2 chlormethyl groups per aromatic nucleus.

14. A process as claimed in claim 1, wherein the adsorber resin has a chlorine content of from 5 to 25% by weight.

15. A process as claimed in claim 1 wherein said primary amines and said secondary amines are respectively polyamines having primary amino groups and polyamines having secondary amino groups.

* * * * *